M. B. RAY & E. K. HENDERSON.
SPRING WHEEL.
APPLICATION FILED AUG. 6, 1913.

1,082,973.

Patented Dec. 30, 1913.

2 SHEETS—SHEET 1.

Witnesses
Robert M. Sutphend.
A. I. Hind.

Inventors
MADISON B. RAY
EDWARD K. HENDERSON.

By Watson E. Coleman
Attorney

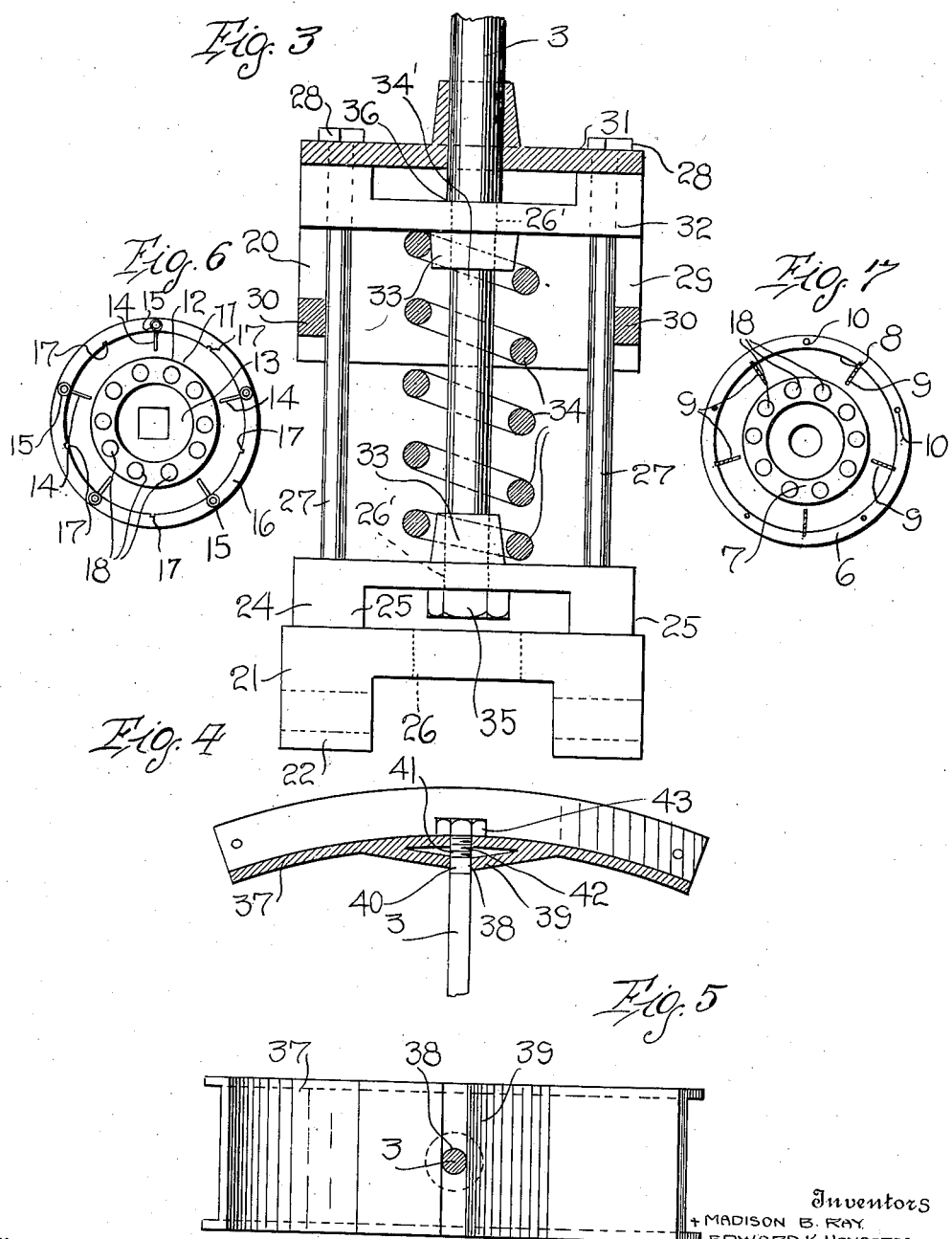

UNITED STATES PATENT OFFICE.

MADISON B RAY AND EDWARD K. HENDERSON, OF NEDERLAND, COLORADO.

SPRING-WHEEL.

1,082,973.

Specification of Letters Patent.

Patented Dec. 30, 1913.

Application filed August 6, 1913. Serial No. 783,376.

*To all whom it may concern:*

Be it known that we, MADISON B. RAY and EDWARD K. HENDERSON, citizens of the United States, residing at Nederland, in the county of Boulder and State of Colorado, have invented certain new and useful Improvements in Spring-Wheels, of which the following is a specification, reference being had to the accompanying drawings.

This invention relates to new and useful improvements in vehicle wheels and more particularly to that class known as resilient wheels, the object of the invention being to provide a resilient wheel, the hub of which is provided with a plurality of radially extending housings or casings having coil springs arranged therein, the rim having a plurality of inwardly extending spokes mounted within the casing and bearing against said springs to relieve the vehicle body from any shock or jar while passing over rough and uneven roads.

A further object of the invention is the provision of a resilient wheel of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1:
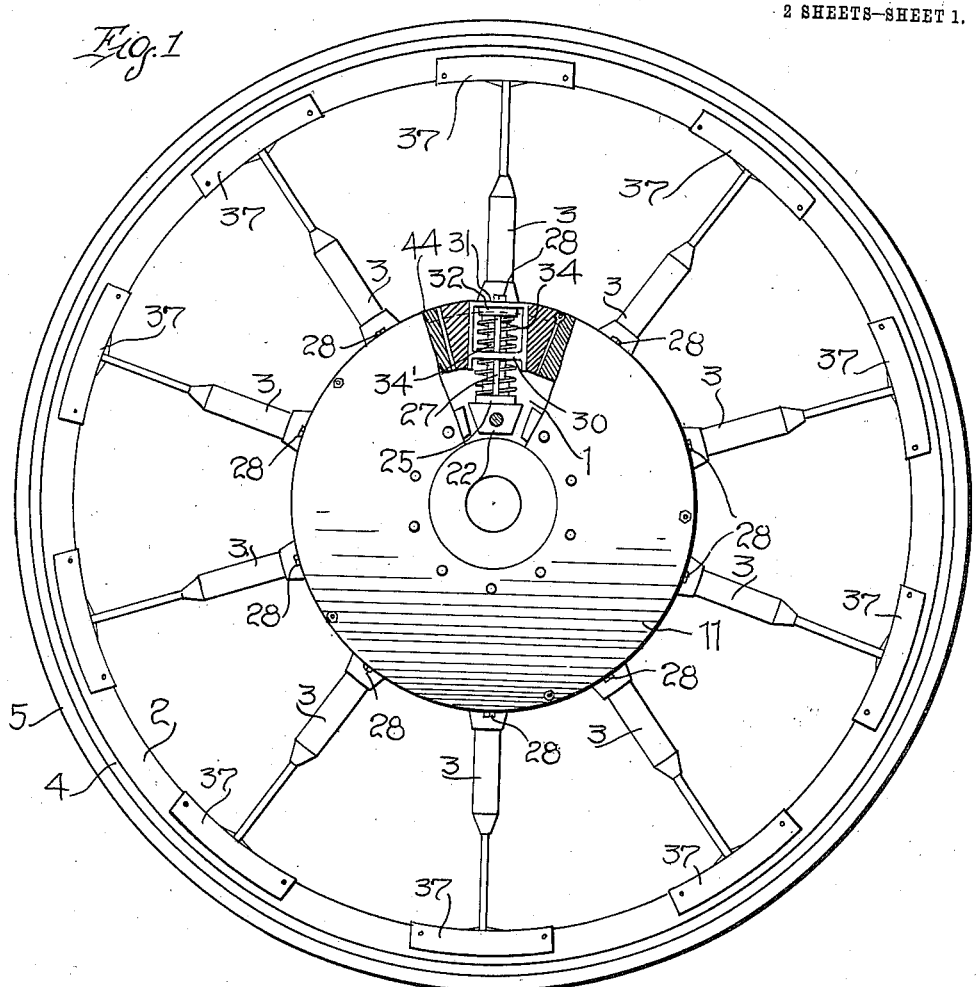
Figure 2:
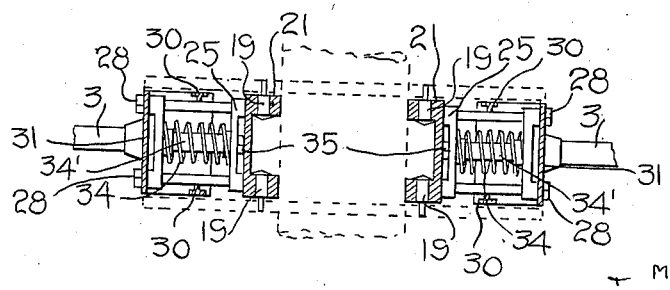

Figure 1 is a side elevation, parts being broken away and in section; Fig. 2 is a transverse sectional view; Fig. 3 is an enlarged vertical sectional view of the casing and springs; Fig. 4 is a detail longitudinal sectional view illustrating the mounting of the outer ends of the spokes; Fig. 5 is a similar detail bottom plan view; Fig. 6 is a side elevation of one of the side plates; Fig. 7 is a side elevation of the other side plate.

Referring more particularly to the drawings, the numeral 1 indicates the hub, 2 the felly and 3 the spokes between the hub and the felly. A rim 4 is mounted upon the outer face of the felly and is provided with a solid rubber tire 5 mounted thereon in any desirable manner. The hub 1 is formed at its inner edge with a preferably integral annular side plate 6, said plate having an annular ring 7 formed thereon adjacent the central portion thereof and an outer annular ring 8 at its outer edge. The plate 6 is provided upon its inner face at intervals with inwardly extending flanges 9 and the ring 8 has openings 10 formed therein between the flanges 9. An outer side plate 11 is disposed upon the opposite edge of the hub, the plate 11 being also formed with an inner ring 12 which provides a seat 13 in the plate inwardly of the ring for the reception of the outer end of the hub. The plate 11 is also formed with inwardly extending flanges 14, the outer edges of which are tubular, as shown at 15, for registration with the openings 10 in the outer ring 8 of the inner side plates 6 and for the reception of the bolts 15'. The plate 11 is provided with an outer annular ring 16, said ring being provided with a plurality of spaced notches 17 which form seats for the reception of the outer edges of the flanges 9 of the side plate 6. Each of the inner rings 7 and 12 of the plates 6 and 11 respectively, is formed with a plurality of openings 18 whereby said plates may be readily connected together by means of bolts 19 which are passed through openings in the inner rings.

Pivotally mounted at their inner ends between the hub plates 6 and 11 are the casings or housings 20 which comprise a base member 21 having inwardly projecting perforated lugs 22 formed at each end thereof, which are pivotally secured to each of the side plates by means of the bolts 19. Mounted upon the base is a seat or guide member 24 having the downwardly projecting lugs 25 formed thereon and adapted to rest upon opposite ends of the base member 21. The base 21 and the guides 24 are provided with alined openings 26 and 26', the purpose of which will be hereinafter more fully described. Extending upwardly from each end of the guide member 24 are the bolts 27, the outer ends of which extend outwardly through suitable openings formed in the outer closed end of the casing 20 and the nuts 28 are threaded thereon to securely retain the casing in position.

The casing 20 comprises the two longitudinal parallel side walls 29 suitably connected at their ends by means of the transverse pieces 30 and connected at their outer longitudinal edges by means of the plate 31. A second guide member 32 is provided which is mounted upon the upper ends of the bolts 27 and arranged just beneath the outer plate 31 of the casing 20. Each of the guide members 24 and 32 is provided at their central portion with alined openings 26' and is further provided with the integrally formed sleeves 33 formed upon the inner faces of the guide members and upon which is mounted the ends of a coil spring 34, said coil spring being arranged within the casing 20 and disposed between the guide members 24 and 32.

The spokes 3 are provided at their inner ends with the circular reduced portions 34' which are slidably mounted within the casing 20 and the inner ends thereof extend through the opening 26' in the inner guide member 24 and nuts 35 are threaded thereon to securely retain the spokes in position. By forming the reduced portion 34' on the spokes, it provides a shoulder 36 which bears against the outer face of the outer guide member 32 so that upon the inward movement of the spokes, the coil springs 34 will be placed under tension. It will be apparent that by having the inner ends of the spokes secured so that the inner guide members 24 will bear against the spring, the vehicle body will be entirely relieved of all shock or jar.

The felly 2 has connected thereto a plurality of keepers 37, each of which is provided with a central opening 34 and is further provided upon its inner face with the downwardly projecting opposed brace members 39. The outer ends of the spokes 3 are preferably flattened, as shown at 40, the flattened portions of the spokes having outwardly projecting extensions 41 which are threaded, as shown at 42. The extensions 41 of the spokes are passed through the openings 38 in the keepers and the outer edges of the flattened portions 40 of the spokes are disposed between the brace members 39 whereby the spokes are securely held against any turning movement whatever. Nuts 43 are threaded upon the outer threaded portions 42 of the extensions 41 which are disposed between the outwardly bent portions 39 of the keepers whereby the spokes are maintained in connection with the felly of the wheel. The spokes are preferably constructed of spring metal so that the flat portions thereof will resist the twisting strain of the rim and the felly with relation to the hub of the wheel.

In the practical use of our device, it will be seen that should the outer periphery of the wheel strike an object in the path of the vehicle, the shock imposed thereby would be readily taken up by the tension of the coil springs 34. It will be noticed that the spokes 3, are so arranged that they are slidably and resiliently mounted. It will be noted that by having the shoulder 36 formed upon each end of the spokes, the spokes upon their inward movement would bear against the outer guide member 32 and compress the coil springs 34. It will be apparent from the foregoing description taken in connection with the accompanying drawings that the wheel may be readily taken apart by removing the bolts 19 and may be quickly and readily placed together again. The device as above described and illustrated in the accompanying drawings is extremely simple in construction and can be manufactured at a comparatively low cost.

Disposed between the plates 6 and 11 and casings or housings 20 are resilient cushion blocks 44, said blocks being maintained in position between the plates by the outer rings 8 and flanges 9 and 14, between the casings or housings 20 serving to separate the cushion blocks arranged in pairs between said casings.

While we have shown the preferred embodiment of our invention, it will be obvious that minor changes in the details of construction and arrangement of the parts may be made within the scope of the appended claim without departing from the spirit of our invention or sacrificing any of the advantages of the same.

What we claim is:—

A wheel comprising a hub, side plates extending outwardly from said hub, a plurality of base members having perforated lugs arranged between the plates and pivotally secured thereto, bolts carried by said base members and arranged in spaced parallel relation, a casing mounted upon the outer ends of said bolts, a guide member mounted upon the base, a second guide member arranged within the casing and in opposed relation with the first guide member, perforated sleeves formed on said guide members, spokes having their inner ends arranged within said sleeves, coil springs having their ends mounted on said sleeves and arranged between the guide members, a shoulder formed upon each of said spokes and adapted for engagement with the outer guide member, whereby to compress said springs upon the inward movement of the spokes, and a rim connecting the outer ends of said spokes.

In testimony whereof we hereunto affix our signatures in the presence of two witnesses.

MADISON B. RAY.
EDWARD K. HENDERSON.

Witnesses:
  WM. T. TODD,
  GEO. HARRIS.